CONTINUOUS OPERABLE NEGATIVE FEEDBACK AMPLIFIER

Filed Oct. 24, 1961 3 Sheets-Sheet 1

Inventor
K. ISHIMOTO-T. SATO-
H. WATANABE
By [signature]
AGENT

CONTINUOUS OPERABLE NEGATIVE FEEDBACK AMPLIFIER

Filed Oct. 24, 1961 3 Sheets-Sheet 2

Inventor
K. ISHIMOTO-T. SATO-
H. WATANABE
By
AGENT

CONTINUOUS OPERABLE NEGATIVE FEEDBACK AMPLIFIER
Filed Oct. 24, 1961 3 Sheets-Sheet 3
Fig. 6
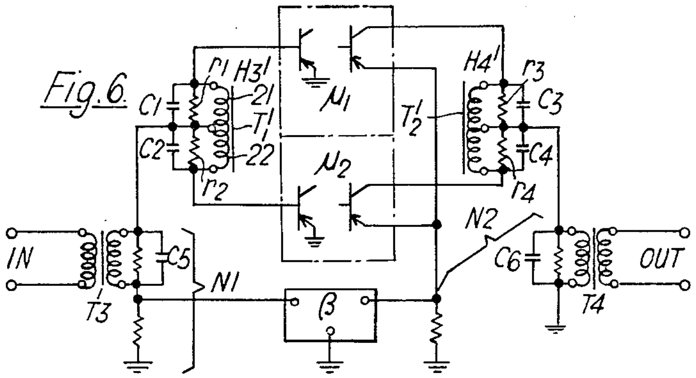
Fig. 7(a).
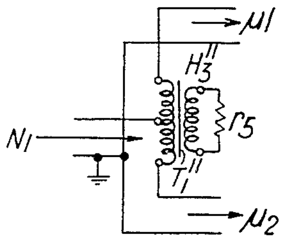
Fig. 7(b).
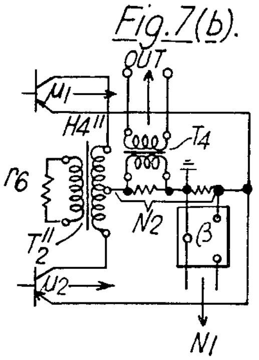
Fig. 8(a). Fig. 8(b). Fig. 8(c).
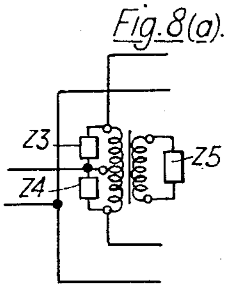
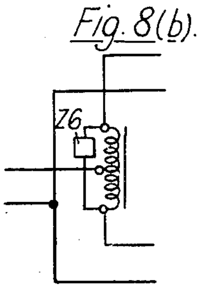
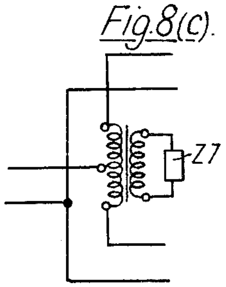
Inventor
K. ISHIMOTO-T. SATO-
H WATANABE
By [signature]
AGENT United States Patent Office 3,202,927
Patented Aug. 24, 1965

3,202,927

CONTINUOUS OPERABLE NEGATIVE FEEDBACK AMPLIFIER

Kunio Ishimoto, Hitoshi Watanabe, and Toshio Sato, Tokyo, Japan, assignors to Nippon Electric Company Limited, Tokyo, Japan, a corporation of Japan Filed Oct. 24, 1961, Ser. No. 147,278
Claims priority, application Japan, Oct. 26, 1960, 35/43,344
17 Claims. (Cl. 330—84)

This invention relates to a signal amplifier of the continuously operable type, that is, and amplifying device wherein even if a malfunction occurs in any of the amplifing paths not only is the signal transmission not interrupted but also the predetermined amplifying function remains constant.

As is well known, signal interruption may cause considerable damage to the data being transmitted and the requirement of transmission continuity is becoming more and more severe. For instance, although the interruption of speech during one second in telephone communications, will not completely disturb its understanding, the interruption of only one second in telegraph transmission will result in the omission of quite a few letters, while the omission of only one numeral in data transmission will completely change the contents. Where signal interruption causes considerable damage it has been proposed, as a counter measure, to use an amplifier device wherein two or more amplifying paths are provided. For example, a working and spare amplifiers are provided; the signal being transmitted through an unfaulted amplifier by change-over switching. Alternative solutions, employing a specific coupling between amplifiers, have also been applied as will be seen later. Known continuous signal amplifying devices, however, have the following disadvantages when a trouble occurs in one of the two or more amplifying paths; the amplified output level decreases, the phase of the amplified output varies, distortion occurs in the output frequency characteristics, and the input or output impedance of the amplifier device varies. However, even when all the amplifying paths are normal, known amplifying devices have unstable factors such that oscillation is apt to occur.

Therefore, one object of this invention is to provide an amplifier device of the continuously operable type in which even if a malfunction occurs in some of the two or more amplifying paths, in so far as any one of the amplifying paths works correctly, not only is the signal transmission not interrupted, but the gain, or the amplification degree, and the input or output impedance remain virtually constant.

Another object of this invention is to provide an amplifier device in which, under the condition described in the preceding paragraph, the phase-shifting characteristics will vary unappreciably and in which there are no unstable factors such as would enhance the occurrence of oscillation.

Still another object of this invention is to provide an amplifier device which can be utilized over a wide frequency range and in which the gain, the input or output impedance, the phase-shifting characteristics, and the stability are not substantially affected, even when a damaged amplifying path is replaced by a new one having different characteristics.

The above-mentioned and other features and objects of this invention and the manner of attaining them will become more apparent and the invention itself will be best understood by reference to the following description of an embodiment of the invention taken in conjunction with the accompanying drawings, in which:

FIG. 1(*b*) is a vector diagram to be used in conjunction with FIG. 1(*a*).

FIGS. 5 and 6 show schematically two preferred embodiments of the invention.

FIG. 7(*a*) shows a prototype of the second type of input hybrid circuit.

FIG. 7(*b*) shows a prototype of the second type of output hybrid circuit together with the output circuit.

FIGS. 8*a*, 8*b*, and 8*c* illustrate modifications of the input hybrid circuit.

In order to clarify the invention disclosed herein some conventional continuous amplifiers will be described first with reference to FIGS. 1(*a*,) 1(*b*,) and 2.

Figure 1A:
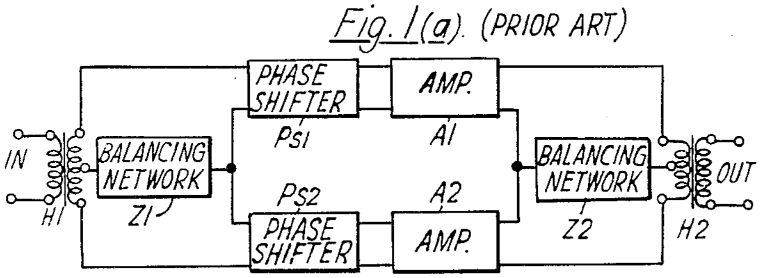
Fig. 1(a). (PRIOR ART)
FIG. 1(*a*) illustrates a conventional continuous signal-amplifier.
Figure 1B:
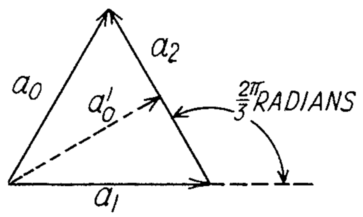
Fig. 1(b). (PRIOR ART)

In FIG. 1(*a*) two amplifiers $A_1$ and $A_2$ are coupled to each other by input and output hybrid circuits $H_1$ and $H_2$ which have balancing networks $Z_1$ and $Z_2$ respectively (assume for the moment that the two phase shifters $Ps_1$ and $Ps_2$ are not present). In such a device, the signal transmission between the input terminal IN and the output terminal OUT will not be interrupted even if the amplifier $A_1$ or the amplifier $A_2$ is damaged. However, it is to be noted that the transmission gain will then be changed, and if either one of the amplifiers $A_1$ and $A_2$ entirely loses its function, a gain variation of —6 db will result. In order to reduce the gain variation phase shifters $Ps_1$ and $Ps_2$ are inserted as shown, between the input hybrid circuit $H_1$ and the amplifiers $A_1$ and $A_2$ respectively, so that a phase difference of $2\pi/3$ radians between the output component $a_1$ of the amplifier $A_1$ and the output component $a_2$ of the amplifier $A_2$ may be obtained. In this manner, the composed output $a_0$ obtained at the output terminal OUT by the recomposition of the transmitted signals at the hybrid circuit $H_2$ becomes as shown in FIG. 1(*b*), and the vector diagram formed by the output component $a_1$, the output component $a_2$, and the composed output $a_0$ becomes an equilateral triangle. Therefore, when a malfunction occurs in one of the amplifiers, for example in the amplifier $A_2$, and its output component $a_2$ gradually decreases, the composed output will vary from the initial $a_0$ through $a'_0$ to $a_1$. If the vector diagram is an exact equilateral triangle, the output of this amplifier device will be minimum at the position of the vector $a'_0$, and will be smaller than the initial value by 1.2 db. Furthermore, the phase of the composed output will then shift by $\pi/3$ radians at maximum.

Figure 2:
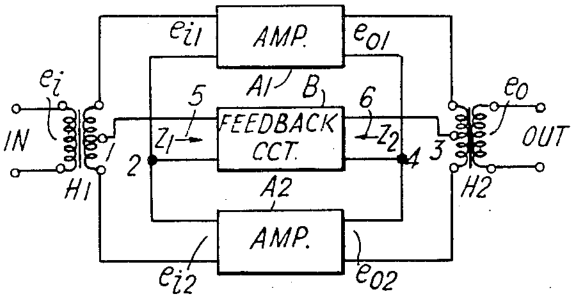
Fig. 2. (PRIOR ART)
FIG. 2 illustrates another conventional continuous signal amplifier.

Referring now to FIG. 2, in which another example of a conventional continuous signal-amplifying device is shown and in which similar numerals designate similar parts to FIG. 1(*a*), the amplifier device comprises a feedback circuit B common to both amplifiers $A_1$ and $A_2$ so arranged that when both of the amplifiers $A_1$ and $A_2$ have their normal gain, no feedback voltage appears across the feedback circuits input terminals 3 and 4. This is due to the cancellation of the amplified outputs of the amplifiers $A_1$ and $A_2$ with each other, and therefore no feedback operation is carried out through the feedback circuit B. Also, the phase relations between the signals in the amplifiers $A_1$ and $A_2$ and in the feedback circuit B are so selected that positive feedback is invariably applied to either of the amplifiers $A_1$ and $A_2$ that is maintaining the ordinary gain. Whereupon, when one of the amplifiers, for example, the amplifier $A_2$ is damaged and its gain decreases, a feedback voltage will appear between input terminals 3 and 4 of the feedback circuit B which has the polarity decided by the amplifier $A_1$ (which is maintaining the ordinary gain) with the result that this voltage is fed back positively to the amplifier $A_1$ and negatively to the amplifier $A_2$. If impedances $z_1$ and $z_2$ of the feedback circuit B as seen in the direction of arrows 5 and 6 are of such values that the echo attenuations, in the directions $A_1$–$H_1$–$A_2$ and $A_1$–$H_2$–$A_2$, are sufficiently large (as they are in the balancing networks $Z_1$ and $Z_2$ of the amplifier device of FIG.1(*a*)) and if the gains $\mu_1$ and $\mu_2$ of the amplifiers $A_1$ and $A_2$ and the reciprocal of the attenuation $\alpha$ of the feedback circuit B are equal with one another, namely $$\mu_1=\mu_2=1/\alpha$$

then the total gain $\mu$ between the input terminal IN and the output terminal OUT will not change, even if either of the amplifiers $A_1$ and $A_2$ are damaged and its gain decreases. That is, if the input and output impedances of the amplifiers $A_1$ and $A_2$ and the input and output impedances of the amplifier device are all equal to one another, and for example, 75 ohms, then it follows that $$z_1=z_2$$

and the following relations are obtained between the input voltage $e_i$ at the input terminal IN and the input voltages $e_{i1}$, $e_{i2}$ and the output voltages $e_{o1}$, $e_{o2}$ of the amplifiers $A_1$ and $A_2$:

$$e_{i1}=e_i/\sqrt{2}+(e_{o1}-e_{o2})\alpha/2$$

$$e_{i2}=-e_i/\sqrt{2}+(e_{o1}-e_{o2})\alpha/2$$

$$e_{o1}=e_{i1}\cdot\mu_1, e_{o2}=e_{i2}\cdot\mu_2, \quad \mu_1\cdot\alpha=1$$

and therefore $$e_{o1}=e_i\cdot\mu_1/\sqrt{2}+(e_{o1}-e_{o2})\mu_1\cdot\alpha/2$$

$$=e_i\cdot\mu_1/\sqrt{2}+(e_{o1}-e_{o2})/2$$

and accordingly $$(e_{o1}+e_{o2})/2=e_i\cdot{}_1/\sqrt{2}$$

From this relation, the output voltage $e_o$ of the output terminal OUT is $$e_o=(e_{o1}+e_{o2})/\sqrt{2}=e_i\cdot\mu_1$$

and the total gain $\mu$ is $$\mu=e_o/e_i=\mu_1$$

It follows therefore that however the gain $\mu_2$ of the amplifier $A_2$ may decrease, the total gain $\mu$ will not be changed.

The above mentioned gain maintaining action of the amplifier device of FIG. 2, however, has to be reconsidered from another standpoint. If it is assumed for simplicity that the amplifier $A_2$ has entirely lost its function, the gain of the loop B–$H_1$–$A_1$–$H_2$–B is equal to ½. This is because $$\mu_1=1/\alpha$$

Therefore, the total gain $\mu$ in this case becomes, in accordance with the principles of feedback amplifiers, $$\mu=(1/\sqrt{2})[\mu_1/(1-½]\cdot1/\sqrt{2}=\mu_1$$

and is not different from the value which holds when both amplifiers $A_1$ and $A_2$ have their normal gains. This proves that the previously mentioned explanations are true. However, as the gain of the loop B–$H_1$–$A_2$–$H_2$–B is also equal to ½ when the amplifier $A_2$ has the normal gain, the gain of the loop starting from the feedback circuit B, through the input side hybrid $H_1$, the amplifiers $A_1$ and $A_2$, and the output side hybrid $H_2$, and returning to the feedback circuit B is equal to 1 and satisfies the oscillation condition. Therefore, it follows that the amplifier device of FIG. 2 is not serviceable as it stands and has an inherent defect. Thereupon, if the device is assumed to be serviceable when the attenuation $\alpha$ of the feedback circuit B is reduced to 0.9$\alpha$ or to 0.9 times that described above in order not to satisfy the oscillation condition the total gain $\mu$, when the amplifier $A_2$ has entirely lost its function, is as follows:

$$\mu=½[\mu_1/(1-0.9/2)]=\mu_1/1.1$$

and is decreased by about 0.8 db as compared with the total gain when both amplifiers $A_1$ and $A_2$ have their normal gains.

Furthermore, in application it is very difficult in both of the amplifier devices of FIG. 1 and FIG. 2 to make the phase shifting characteristics of the two amplifiers $A_1$ and $A_2$ agree with each other over the desired frequency range. It is accordingly often that the resulting distortion of the frequency characteristics of the total gain of the amplifier devices exceeds a permissible value. Also, the variation of the input and output impedances of the amplifier device caused by various malfunctions which have occurred in either of the amplifiers $A_1$ and $A_2$ frequently exceeds a permissible value causing great difficulty particularly in the case where the amplifier device is directly connected with a filter circuit. Thus, it may be seen that conventional amplifier devices of the continuously operable type have many weak points and are unable to achieve the technical qualities desired.

An amplifying device according to the invention will now be explained hereunder with reference to FIGS. 3 to 8.

Figure 3:
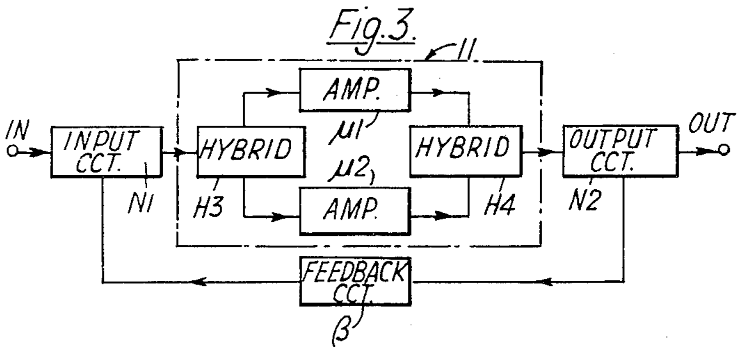
FIG. 3 is a block form illustration of a continuous signal-amplifier according to the invention.

As shown in FIG. 3 the amplifying device of this invention is so arranged that the input signal is supplied from input circuit $N_1$ to two amplifying paths $\mu_1$ and $\mu_2$, which have similar characteristics, by input hybrid circuit $H_3$. $H_3$ supplies the equally divided outputs of both the input circuit $N_1$ and a feedback circuit $\beta$ to these amplifying paths while avoiding as much as possible interference between the two amplifying paths. The output voltages of these amplifying paths are applied to both output circuit $N_2$ and feedback circuit $\beta$ by an output hybrid circuit $H_4$ which recomposes the two output voltages again avoiding as much as possible any interference between these amplifying paths. The output signal is then available at the output circuit $N_2$ at an output terminal OUT. Briefly stated, the amplifier device is a feedback amplifier comprising an input and output circuit $N_1$ and $N_2$, a feedback circuit $\beta$, and an amplifying circuit 11.

What is meant by the phrase "avoiding as much as possible interference between the two amplifying paths" ($\mu_1$ and $\mu_2$) is that by making the attenuations in the directions $\mu_1$–$H_3$–$\mu_2$ and $\mu_1$–$H_4$–$\mu_2$ large at the input and output hybrid circuits $H_3$ and $H_4$, the transmission functions of the amplifying paths $\mu_1$ and $\mu_2$ are decided substantially by the conditions of the respective amplifying paths and not by the condition of the other of the amplifying paths. Therefore, whatever malfunctions may occur in either of the amplifying paths $\mu_1$ and $\mu_2$, the transmission function of the amplifying circuit 11 is not lost and the gain reduction of the amplifying circuit 11 is only 6 db at maximum. It is to be noted here that in the whole amplifier device the gain variation is that of the amplifying circuit 11 as reduced in accordance with feedback values of the feedback circuit $\beta$. Thus, if the feedback value is 36 db before the occurrence of the damage, a gain reduction of 6 db in the amplifying circuit 11 will cause a gain reduction of only about 0.1 db in the whole amplifier device. Also, the variations of the input and output impedances and of the phase shifting characteristics are reduced according to the feedback values of the feedback circuit.

Figure 4:
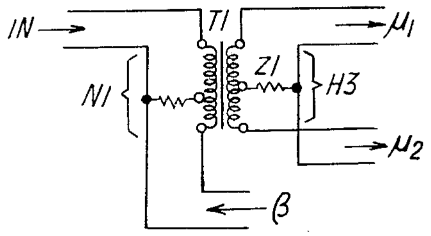
FIG. 4 illustrates the first type input circuit and input hybrid circuit.

It may be expected that the hybrid circuits $H_1$ and $H_2$ used in known continuous signal amplifiers (as shown in FIG. 1(*a*) and FIG. 2) could also be utilized in this device as hybrid circuits $H_3$ and $H_4$. These hybrid circuits would divide the output supplied from both the input circuit $N_1$ and the feedback circuit $\beta$ so as to apply to the two amplifying paths $\mu_1$ and $\mu_2$ signals of substantially opposite phase; recomposing the outputs of the two amplifying paths $\mu_1$ and $\mu_2$, which have opposite phase, so as to supply both the output circuit and the feedback circuit $\beta$ with signals of the same phase (this type of hybrid circuit will hereinafter be called the first type hybrid circuit). The first type hybrid circuit is advantageous in that the input circuit $N_1$ and the input hybrid circuit $H_3$ may be formed by only a single transformer $T_1$ accompanying the balancing network $Z_1$ as shown in FIG. 4. In this example, the device is of a hybrid feedback type. In this case, however, both the transmission from the input circuit through the input hybrid circuit $H_3$ to the two amplifying paths $\mu_1$ and $\mu_2$, and the transmission from these two amplifying paths $\mu_1$ and $\mu_2$ through the output hybrid circuit $H_4$ to the output circuit $N_2$ are performed by the mutual coupling between the windings of the transformer $T_1$ and its output side counterpart (not shown). This results in the restriction on, and the large phase shifting of, the transmissible signal frequencies because of the leakage inductances and the main inductances of these transformers. Furthermore, these transformers which are included in the feedback loop cause, as is well known, a serious restriction on the maximum feedback value of the loop. On the other hand, the function of the whole amplifier depends, as has been mentioned, intimately upon the feedback value, with the result that this limitation on the maximum feedback value restricts its characteristics and makes it extremely difficult to use this amplifier as a broad-band device.

Before explaining this invention with reference to FIG. 5, which is a circuit diagram of a preferred embodiment wherein the hybrid type feedback is adapted to the input and the output side, and with reference to FIG. 6 which is a circuit diagram of another preferred embodiment wherein a series type feedback is adapted to the input and the output side, the prototype of a second type hybrid circuit used in these embodiments will be explained with reference to FIG. 7.

Figure 5:
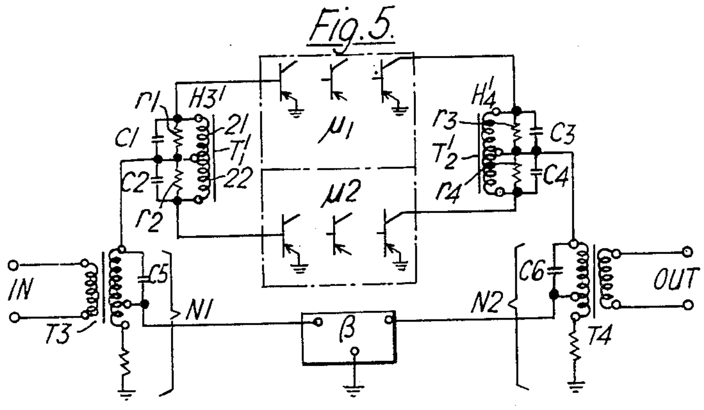

The second type input hybrid circuit $H_3''$ shown in FIG. 7(*a*) divides the outputs of both the input circuit $N_1$ (not shown) and the feedback circuit $\beta$ so as to apply signals in phase to the two amplifying paths $\mu_1$ and $\mu_2$ shows in FIGS. 5 and 6. The second type output hybrid circuit $H_4''$ shown in FIG. 7(*b*) recomposes the outputs of the two amplifying paths $\mu_1$ and $\mu_2$ having the same phase so as to supply these outputs in phase to both the output circuit $N_2$ and the feedback circuit $\beta$, and is a prototype of the output hybrid circuit $H_4'$ in the amplifier shown in FIG. 6. In neither of these second type hybrid circuits $H_3''$ and $H_4''$, is the transmission from both the feedback circuit $\beta$ and the input circuit $N_1$ through the input hybrid circuit $H_3''$ to the amplifying paths $\mu_1$ and $\mu_2$, and the transmission from the amplifying paths $\mu_1$ and $\mu_2$ through the output hybrid circuit $H_4''$ to both the output circuit $N_2$ and the feedback circuit $\beta$ performed (as easily understood by referring to FIGS. 3 and 7) solely by the mutual coupling between the windings of the transformers $T_1''$ and $T_2''$. Therefore, it is possible to considerably increase the maximum feedback value as compared with the case where the first type hybrid circuits are used.

Furthermore, use of the second type hybrid circuits has a large advantage in that it is thereby made possible to arrange the hybrid circuit portions in the manner shown in the embodiments of FIGS. 5 and 6 and to further increase the possible maximum feedback value.

In the continuous amplifiers shown in FIGS. 5 and 6, similar nomenclature is used to designate similar parts of the block diagram shown in FIG. 3. It is to be noted that the amplifying elements which are shown as transistors may also be vacuum tubes. Each of the input hybrid circuits $H_3'$ in FIGS. 5 and 6 comprises a transformer $T_1'$ which is formed by excluding from the windings of the transformer $T_1''$ shown in FIG. 7(*a*) the winding on the side of the balancing network $r_5$, leaving a two-winding differential transformer having two windings 21 and 22 with a turn ratio of 1:1, and two resistors $r_1$ and $r_2$ which are formed by dividing the balancing network $r_5$ shown in FIG. 7(*a*) so as to be electrically equivalent therewith, which windings 21 and 22 and which resistors $r_1$ and $r_2$ are connected in parallel, respectively. Similarly, the output hybrid circuit $H_4'$ is composed of a transformer $T_2'$ which is formed, by excluding from the windings of the transformer $T_2''$ shown in FIG. 7(*b*) the winding located on the side of the balancing network $r_6$, leaving a two-winding differential transformer having two windings with a turn ratio of 1:1, and of two resistors $r_3$ and $r_4$ which are formed by dividing the balancing network $r_6$ so as to be electrically equivalent therewith, in a like manner as the input hybrid circuit $H_3'$. By selecting the values of the resistors $r_1$, $r_2$, $r_3$ and $r_4$ so that the attenuations in the directions $\mu_1$–$H_3'$–$\mu_2$ and $\mu_1$–$H_4'$–$\mu_2$ are large, the hybrid circuits $H_3'$ and $H_4'$ can decrease the interference between the amplifying paths $\mu_1$ and $\mu_2$ over a very wide frequency range. This is due to the fact that, since each of the differential transformers $T_1'$ and $T_2'$ in the hybrid circuits $H_3'$ and $H_4'$ has two windings of 1:1 turn ratio, it is possible to assume almost ideal behavior. Moreover, since the resistors $r_1$, $r_2$, $r_3$, and $r_4$ are connected in parallel with the differential windings of the transformers $T_1'$ and $T_2'$ and since, as shown in FIGS. 5 and 6, condensers $C_1$, $C_2$, $C_3$ and $C_4$ for preventing oscillation at higher frequencies can be connected in parallel with those resistors and similar condensers $C_5$ and $C_6$, also for preventing oscillation at higher frequencies can be connected in parallel with the windings of the transformer $T_3$ in the input circuit $N_1$ and of the transformer $T_4$ in the output circuit $N_2$ respectively; it is possible to eliminate troubles which would be caused by the leakage inductances or main inductances of the transformers $T_1'$ and $T_2'$ of the hybrid circuits $H_3'$ and $H_4'$ and to obtain a large maximum feedback value from the very low to the very high frequency range. That is to say, the use of the second type hybrid circuits prevents oscillations at high frequencies by the utilization of condensers $C_1$, $C_2$, $C_3$, $C_4$, $C_5$, $C_6$, and prevents oscillations at low frequencies by the main inductances of the included transformers. In other words, it may be said that the resistors $r_1$, $r_2$, $r_3$ and $r_4$ and the condensers $C_1$, $C_2$, $C_3$ and $C_4$ serve a dual function that of balancing network elements and elements for preventing oscillation.

In the amplifier devices of FIG. 5 and FIG. 6, although the feedback signals are derived from the dividing point of the voltage supplied to the output circuit $N_2$ from the output hybrid circuit $H_4'$, the polarities of the feedback from the output circuit $N_2$ to the feedback circuit $\beta$ are opposite to each other. This is because the amplifying paths $\mu_1$ and $\mu_2$ shown in FIG. 5 and those shown in FIG. 6 have the reverse phase shifting characteristics. By applying the second type hybrid circuit to this invention, it is possible, as shown in the embodiment of FIG. 6 to effect the feedback from a point, such as the emitter of the last stage transistor, where the capacity to ground is not influenced directly from the input or output hybrid circuit or the input or output circuit. When this principle is applied to both the input and output side, the amplifier device of this invention may be used over a wider frequency range. In this case, the terminal of the output circuit $N_2$ is not grounded (as in FIG. 5), but rather as shown in FIG. 6 and particularly in FIG. 7(*b*), the point of connection between the output transformer $T_4$ and the feedback circuit $\beta$ is grounded so as to reverse the polarity of the feedback from the output circuit $N_2$ to the feedback circuit $\beta$.

In FIG. 8 several modifications of the input hybrid circuit are shown. It is also possible to similarly modify the output hybrid circuit. Moreover, it is possible to choose, according to the use of the amplifier device of this invention, any simple resistors and complex two terminal networks as the balancing networks $Z_3$, $Z_4$, $Z_5$, $Z_6$ and $Z_7$.

According to the invention, the maximum feedback value can, as has been mentioned, be made as large as that in the known feedback amplifiers; whereby not only can signal interruptions caused by trouble in an amplifying path be prevented, but also the variation of the gain, the input and output impedances, and the transmission phase shifting characteristics can be limited to a remarkably small value. In the foregoing description, no mention has been made of the power supply for the amplifying elements. Any conventional power supply will suffice the only requirement being that a malfunction in one path does not affect the others or the hybrid circuits, the input or output circuit, or the feedback circuit. Since when either of the amplifying paths malfunctions it is generally replaced by a new one, the load in the meantime being taken by the other, it is preferable to mount the parts enclosed by the broken lines in FIGS. 5 and 6 separately. On such replacing, the amplifier device of the invention will prove itself advantageous in that the influence on the gain, the input and output impedances, and the transmission phase shifting characteristics caused by the inequality which may exist between the old and the new amplifying paths is made negligible by the suppressing action achieved by the large feedback.

Although modifications of the hybrid circuits have been described with reference to FIG. 8, the hybrid circuits themselves are not restricted to those wherein transformers are used. Also, the amplifying paths are not restricted to only two, but three or more amplifying paths may be coupled by groups of hybrid circuits in a similar manner as shown in FIGS. 3, 5 and 6. In the amplifier device of this invention, it is further possible to adapt various feedback forms or amplifier elements in accordance with the use and to apply proper means for preventing harmful oscillations in accordance with the circumstances.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A highly reliable amplifier of the negative feedback type in which the same information is amplified in each of a plurality of parallel amplifying paths, each having an input and output side, comprising: a signal information input circuit; a hybrid input isolating circuit connected to said signal input circuit and to the input side of each of said amplifying paths for supplying the same information signal to each amplifying path and for isolating said input sides from each other; a hybrid output isolating circuit connected to the output side of each amplifying path for combining the signals from said amplifying paths and for isolating said output sides from each other; an output circuit connected to receive the thus combined signals from said hybrid output circuit; and a single feedback path connected between said output circuit and said information input circuit for negatively feeding back a component of said combined signal to said information input circuit.

2. An amplifier as claimed in claim 1 further comprising means in said input hybrid circuit for applying the signal from said input circuit and said feedback path in phase to said amplifying paths, and means in said hybrid output circuit for combining the in-phase signals from said amplifying paths and for applying the combined signal to said output circuit.

3. An amplifier as claimed in claim 2 wherein at least a preselected one of said hybrid circuits includes means for extending the isolation between amplifying paths over a wide frequency range, said isolation extending means, in turn, including: a balancing network connected to balance said preselected hybrid circuit and a hybrid coil comprising differential windings having a neutral tap, said neutral tap being connected to that one of said input and output circuits which is connected to said preselected hybrid circuit, the ends of said differential windings being directly connected to a predetermined side of said amplifying paths; and wherein means for preventing oscillations of the highly reliable amplifier are connected to said differential windings.

4. An amplifier as claimed in claim 2 in which at least a preselected one of said hybrid circuits includes a two-winding hybrid coil and a balancing network for balancing the hybrid circuit, the windings of said hybrid coil being differential windings each having a neutral tap, said balancing network being connected to said differential windings, said neutral tap being connected to that one of said input and said output circuits which is connected to said preselected hybrid circuit, the ends of said differential windings being connected to a predetermined side of said amplifying paths.

5. An amplifier as claimed in claim 4 in which the impedance characteristics of said portion of said balancing network connected to said differential windings are such as to prevent the amplifier from oscillating.

6. An amplifier as claimed in claim 2, in which at least a preselected one of said hybrid circuits is composed of a three-winding hybrid coil and a balancing network for balancing said preselected circuit, two of the three windings of said hybrid coil constituting differential windings and having a neutral tap, the remaining winding of said hybrid coil being a balancing network winding for coupling thereto a portion of said balancing network, the remaining portion of said balancing network being connected to said differential windings, said neutral tap being connected to that one of said input and said output circuit which is connected to said preselected hybrid circuit, the ends of said differential windings being connected to a predetermined side of said amplifying paths.

7. An amplifier as claimed in claim 6 in which the impedance characteristics of said portion of said balancing network connected to said differential windings are such as to prevent the amplifier from oscillating.

8. An amplifier as claimed in claim 2 in which said output circuit includes: two input terminals for receiving said combined signal from said hybrid output circuit; two output terminals for deriving said combined signal at the output end of the amplifier; and two feedback terminals for supplying feedback signals to said feedback path, one of said input and one of said feedback terminals being grounded, the other feedback terminal being connected to a first point common to the feedback path and to said output circuit, the position of said point being chosen to select a portion of the combined signals impressed across said two input terminals for feedback along said feedback path.

9. An amplifier as claimed in claim 2, in which said output circuit includes: two input terminals for receiving said combined signal from said output hybrid circuit; two output terminals for deriving said combining signal at the output end of the amplifier; and two feedback terminals for supplying said feedback signal to said feedback path; and wherein that input terminal which is not connected to said output hybrid circuit and one of said feedback terminals are connected to said amplifying paths and to said feedback path, the other feedback terminal being connected to ground and to a first point common to the feedback path and to said output circuit, the position of said point being chosen to select a portion of the combined signals impressed across said two input terminals for feedback along said feedback path.

10. An amplifier as claimed in claim 9 in which said output circuit comprises an output transformer whose primary winding is connected to that input terminal which is connected to said output hybrid circuit and to an output terminal, and whose secondary winding is connected to said two feedback terminals; and wherein capacitive means are connected to said primary winding of said output transformer for preventing oscillations.

11. An amplifier as claimed in claim 8, in which said output circuit comprises an output transformer whose primary winding is connected to both that input terminal which is connected to said output hybrid cricuit and to that feedback terminal which is connected to said first point and whose secondary winding is connected to said two output terminals.

12. An amplifier as claimed in claim 11 further comprising capacitive means connected to said primary winding of said output transformer for preventing oscillations.

13. An amplifier as claimed in claim 2 in which said input circuit includes: two signal input terminals for receiving an information input signal to be amplified; two feedback terminals for receiving feedback signals from said feedback path; and two output terminals for supplying both said information input and said feedback signals to said input hybrid circuit; one of said feedback terminals in said input circuit and one of said output terminals of said input circuit being grounded, the other feedback terminal in said input circuit being connected to a second point common to said feedback path and to said input circuit, the position of said second point being selected to add the feedback signals to the signals impressed across said two input circuit input terminals.

14. An amplifier as claimed in claim 2, in which said input circuit includes: two signal input terminals for receiving an information input signal to be amplified; two feedback terminals for receiving feedback signals from said feedback path, and two output terminals for supplying said input and said feedback signals through said input hybrid circuit to said amplifying paths; and wherein one feedback terminal and one output terminal of said input circuit are interconnected and connected to both said feedback path and input hybrid circuit, the other input circuit feedback terminal being connected to ground and to a second point in said input circuit which is positioned to add the signals impressed across said two input terminals of said input circuit and said feedback signals.

15. An amplifier as claimed in claim 14 in which said input circuit comprises an input transformer whose primary winding is connected to said two input terminals of said input circuit and whose secondary winding is connected to that output terminal of said input circuit which is connected to said input hybrid circuit and to that feedback terminal of said input circuit which is not interconnected with an output terminal thereof.

16. An amplifier as claimed in claim 14 in which said input circuit comprises an input transformer whose primary winding is connected to said two input terminals and whose secondary winding is connected to that feedback terminal which is connected to said input hybrid circuit and to that output terminal which is not interconnected with a feedback terminal; and capacitive means connected to said secondary winding of said input transformer for preventing oscillations.

17. An amplifier as claimed in claim 15, further comprising capacitive means connected to said secondary winding of said input transformer for preventing oscillation.

References Cited by the Examiner

UNITED STATES PATENTS

| | | | |
|---|---|---|---|
| 2,315,312 | 3/43 | Brown | 330—84 |
| 2,748,201 | 5/56 | McMillan | 330—84 |
| 3,075,153 | 1/63 | Dodd et al. | 330—84 X |

OTHER REFERENCES

German printed applications Poshadel, 13,665, Mar. 8, 1956.

ROY LAKE, *Primary Examiner.*

ARTHUR GAUSS, *Examiner.*